US 7,536,568 B2

(12) United States Patent
Price et al.

(10) Patent No.: US 7,536,568 B2
(45) Date of Patent: May 19, 2009

(54) ULTRA LOW POWER WAKE-UP CIRCUIT

(75) Inventors: Jeffrey E. Price, Wildwood, MO (US);
Michael E. Bisch, Kirkwood, MO (US);
Hector Hernandez, Godfrey, IL (US);
Jeffrey E. Forrest, Collinsville, IL (US)

(73) Assignee: Covidien AG (CH)

( * ) Notice: Subject to any disclaimer, the term of this patent is extended or adjusted under 35 U.S.C. 154(b) by 447 days.

(21) Appl. No.: 11/291,249

(22) Filed: Dec. 1, 2005

(65) Prior Publication Data

US 2007/0130479 A1      Jun. 7, 2007

(51) Int. Cl.
*G06F 1/26*     (2006.01)
*G06F 1/32*     (2006.01)

(52) U.S. Cl. .................. 713/300; 713/310; 713/320; 713/323; 713/324; 713/330; 713/340

(58) Field of Classification Search ................ 713/300, 713/310, 320–324, 330, 340
See application file for complete search history.

(56) References Cited

U.S. PATENT DOCUMENTS

| 5,450,003 | A | * | 9/1995 | Cheon ..................... 323/272 |
| 5,787,294 | A | * | 7/1998 | Evoy ...................... 713/320 |
| 6,591,368 | B1 | * | 7/2003 | Ryu ....................... 713/323 |
| 6,735,705 | B1 | * | 5/2004 | Egbert et al. ............... 713/300 |
| 6,925,024 | B2 | | 8/2005 | Lovett et al. |
| 2004/0215983 | A1 | * | 10/2004 | Kwahk et al. .............. 713/300 |
| 2005/0070811 | A1 | * | 3/2005 | Crowley .................. 600/549 |
| 2006/0080560 | A1 | * | 4/2006 | Miller .................... 713/300 |

FOREIGN PATENT DOCUMENTS

| JP | 61206018 A | 9/1986 |
| JP | 61187433 U | 11/1986 |
| JP | 06043037 A | 2/1994 |
| JP | 06074940 U | 10/1994 |
| JP | 11296265 A | 10/1999 |
| JP | 2005287171 A | 10/2005 |

* cited by examiner

*Primary Examiner*—Thomas Lee
*Assistant Examiner*—Fahmida Rahman
(74) *Attorney, Agent, or Firm*—Edward S. Jarmolowicz, Esq.

(57) ABSTRACT

An apparatus for selectively enabling power including a power supply, and a device having a controller and an input activated by a user. The controller is selectively powered by the power supply. While the device is in a sleep state, a sensing circuit senses activation of the input by the user and enables the power supply to provide power to the controller in response to the sensed activation of the input by the user. A latch circuit causes the power supply to continue to provide power to the controller. The controller is responsive to the sensed activation of the input by the user for enabling the latch circuit and for disabling the latch circuit, thereby reentering the device into a sleep state.

6 Claims, 3 Drawing Sheets

ULTRA LOW POWER WAKE-UP CIRCUIT

FIELD OF THE INVENTION

The present invention generally relates to electronic devices having a sleep mode. In particular, the invention relates to a method and apparatus for placing an electronic device in a power conserving sleep mode and waking it upon an input from a user.

BACKGROUND OF THE INVENTION

For many years, battery-operated devices have been popular. In early devices, the user was required to power down the device or manually disconnect the battery from the device via a switch so that the device did not drain the battery when not in use.

There are now a number of electronic devices that have been developed to operate with low power so that completely isolating the batteries via a user-operated switch is not necessary. More recent electronic devices have also been designed with a sleep state wherein the microprocessor of the device will use a switch to cut power to nonessential elements of the device thereby saving additional energy by eliminating the leakage currents in those elements. When a user presses a button or otherwise attempts to use the device, the device wakes up and the processor causes power to be restored to the deactivated elements. Even in their sleep state, these low power devices still have leakage currents.

Even small leakage currents can significantly impact battery life. The following Table 1 illustrates one model of shelf life of a 9 volt battery and a comparable set of AA batteries.

TABLE 1

|   | Total Capacity (mAH) | Self Discharge (2% per yr) |
| --- | --- | --- |
| 9 V | 580 mAH | 11.6 mAH/yr |
| AA | 2700 mAH | 54 mAH/yr |

Table 1 assumes a self discharge rate of 2% per year of the capacity of a battery. Assuming now that a battery will last a year in a device and that the device is idle for 16 hours every day, then this self discharge rate is equivalent to an idle current drain of 9.2 microamps in the case of the AA batteries and 1.99 microamps in the case of the 9V battery.

Modem electronic devices are generally designed to use very little power while idle. This is generally accomplished by use of a sleep state in which most components are designed not to conduct any current. However, a CMOS device inherently allows some current flow called leakage current. Leakage currents present a significant impediment to battery life and energy conservation. The following Table 2 illustrates the amount of power dissipated by a device with different leakage currents assuming that the battery lasts at least a year in a device and that the device is in its sleep state for 16 hours every day.

TABLE 2

|   | 40 uA leakage | | 5 uA leakage | | 1 uA leakage | |
| --- | --- | --- | --- | --- | --- | --- |
|   | Power Loss (mAH/yr) | % of total capacity | Power Loss (mAH/yr) | % of total capacity | Power Loss (mAH/yr) | % of total capacity |
| 9 V | 233.6 | 40.28% | 29.2 | 5.03% | 5.84 | 1.01% |
| AA | 233.6 | 8.65% | 29.2 | 1.08% | 5.84 | 0.22% |

As shown in Table 2, leakage currents can present a significant energy drain during a sleep state and impact battery life. For the above-described usage scenario, almost half of the capacity (40.28%) of a 9V battery is dissipated by a device with only 40 microamps of leakage current in its sleep state. Reducing the leakage current to 1 microamp means that at the end of the year, the battery has retained over 39% of its capacity that it would have otherwise lost to leakage currents. Additionally, since only 1% of the battery's capacity is lost to leakage currents during the device's sleep state, the battery's own self discharge rate (approximately 2% per year) becomes a relatively important factor in the life of the battery. Thus, it is highly desirable to decrease the sleep state current draw of these devices to improve battery life and/or generally conserve energy. More specifically, it is desirable to substantially eliminate leakage currents within the device while it is in its sleep state, and still be able to easily and quickly wake the device from its sleep state.

SUMMARY OF THE INVENTION

In accordance with one aspect of the invention, an apparatus is provided for selectively enabling power. The apparatus includes a power supply and a device having a controller and an input activated by a user. The controller is selectively powered by the power supply. A sensing circuit senses activation of the input activated by the user and enables the power supply to provide power to the device's controller in response to the sensed activation of the input by the user. The controller is responsive to the sensed activation of the input by the user for enabling a latch circuit and for subsequently disabling the latch circuit. The latch circuit causes the power supply to continue to provide power to the controller while it is enabled.

In accordance with another aspect of the invention, a method is provided for selectively enabling a power supply of a device having a controller selectively powered by the power supply. The activation of an input by a user of the device is sensed. The power supply is enabled to provide power to the controller in response to the sensed activation of the input by the user. The enabled power supply is latched to provide power to the controller during operation of the device. The power supply is disabled to discontinue providing power to the controller.

In accordance with another aspect of the invention, an apparatus is provided for selectively enabling power. The apparatus includes a power supply and a device having a controller and an input activated by a user. The controller is selectively powered by the power supply. The apparatus also includes a sensing circuit for sensing activation of the input by the user and for enabling the power supply to provide power to the controller in response to the sensed activation of the input by the user. The controller is responsive to the sensed activation of the input by the user for causing the sensing circuit to continue enabling the power supply to provide power to the controller during operation of the device and for causing the sensing circuit to disable the power supply from providing power to the controller.

Alternatively, the invention may comprise various other methods and apparatuses.

Other objects and features will be in part apparent and in part pointed out hereinafter.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION OF THE INVENTION

In one embodiment, the present invention is an ultra low power wake-up circuit which draws essentially no power while waiting for a user input. Power is supplied to components of the wake-up circuit directly from a power supply and power is selectively supplied to device components through a load switch. The wake-up circuit is adapted to wake up the device in response to any number of events, such as a user pushing any of the input keys on the device's user interface, removing or replacing a component from its docking position on the device, receiving a signal from another device, or opening or closing the cover of the device. For example, in the case of a clinical thermometer such as a predictive or infrared thermometer, the device should have the capability to wake up whenever the temperature probe is removed or replaced, whenever the probe cover is removed or replaced, whenever a button on the device is pressed, or whenever a device cover is opened or closed. The thermometer has a microprocessor responsive to the inputs from the buttons and the probe and performs functions in response to these inputs. In some embodiments, after the thermometer has performed its function, the microprocessor waits for a preset time and instructs the wake-up circuit to place the device in its sleep state. In general, the function of the device, the events that wake it up, and the events that return it to its sleep state are based on system-defined requirements and such activities can be hard-wired or manual. One skilled in the art will recognize that the invention is also applicable to pulse meters, blood pressure monitors, predictive thermometers, blood sugar monitors, and other electrical devices.

The following discussion is focused on reducing power consumption of battery-powered devices so that their batteries have a longer life. One skilled in the art will notice that the invention is equally applicable to devices with other types of power supplies such as AC to DC converters, AC sources, and other power sources to reduce power consumption.

Figure 1:
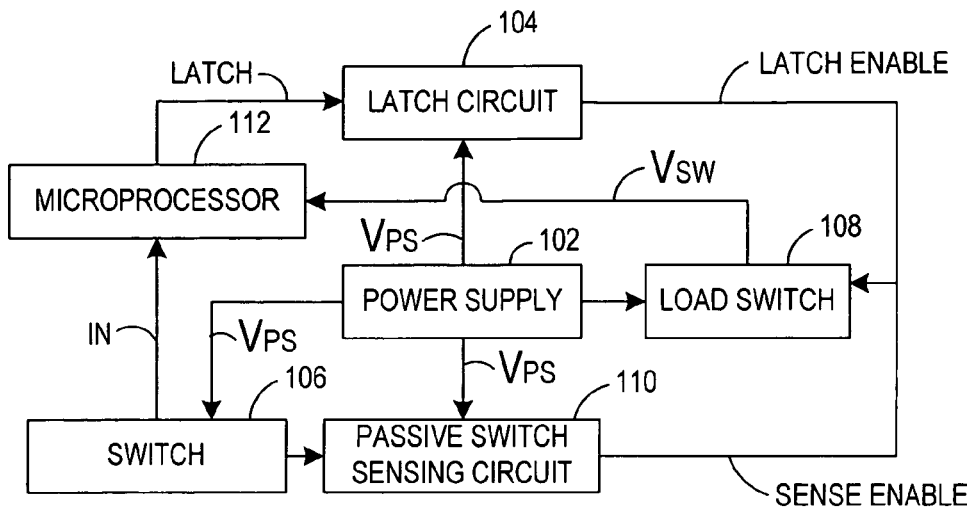
FIG. 1 is a block diagram illustrating a wakeup circuit using a passive switch sensing circuit and a latch circuit according to one embodiment of the invention.

Referring now to FIG. 1, an embodiment of the invention using a passive switch-sensing circuit and separate latch circuit is illustrated. A power supply 102 continuously supplies power to a latch circuit 104, a switch 106, a passive switch sensing circuit 110, and a load switch 108, all of which, optionally, may be configured to have substantially no leakage currents while waiting for a user input.

In one embodiment, this can be accomplished by designing the circuits and switches such that they are substantially free of CMOS components and rely instead on only NMOS devices. The power supply 102 may be batteries or any other power device such as an AC/DC power converter. Additionally, the switch 106 may be an array of user input switches (see FIG. 3).

The passive switch-sensing circuit 110 detects when a user actuates switch 106 of the device and provides a SENSE ENABLE signal of a preset duration to enable the load switch 108 to connect the power supply 102 and a microprocessor 112 via the load switch 108 and to connect any other device components such as memory and/or a communications component (not shown) to the power supply 102. In response to receiving power, the microprocessor 112 activates the latch circuit 104 by a LATCH signal and performs functions based on user input IN from the actuated switch 106. The activated latch circuit 104 provides a LATCH ENABLE signal to the load switch 108 to continue supplying power to the device's components including the microprocessor 112. When the device has finished its operations, the microprocessor 112 waits for more user input for a preset time period (e.g. a timeout period set by the user) and then signals the latch circuit 104 via the LATCH signal to place the device back into its sleep state. For example, the microprocessor 112 may discontinue providing the LATCH signal to the latch circuit 104. The latch circuit 104 signals the load switch 108 (e.g., discontinues providing the LATCH ENABLE signal) to stop supplying power to the device. The load switch 108 then changes state to discontinue supplying power VSW to the microprocessor 112. The device thus returns to its sleep state wherein power VPS is only supplied to the user input switch 106, passive switch sensing circuit 110, latch circuit 104, and the load switch 108. It remains in this sleep state waiting for user input via switch 106.

In operation, a user presses a switch 106 on the device to begin use of the device. The passive switch sensing circuit 110 senses the change of state of switch 106 and temporarily produces the SENSE ENABLE signal causing the load switch to provide power VSW to the microprocessor 112. In response to the power, the microprocessor 112 starts up and provides the LATCH signal to the latch circuit. In response to the LATCH signal, the latch circuit provides the LATCH ENABLE signal to the load switch which continues to maintain load switch in its enabled state, causing it to continue supplying power from the power supply 102 to the microprocessor 112. The user can then use the device for its intended purpose. When the device has finished its operations, the microprocessor 112 waits for further user input for a preset time. If no such input is received within a time-out period, the microprocessor 112 terminates the LATCH signal which causes the latch circuit to terminate the LATCH ENABLE signal, and the load switch stops supplying power VSW to the microprocessor 112.

Figure 2:
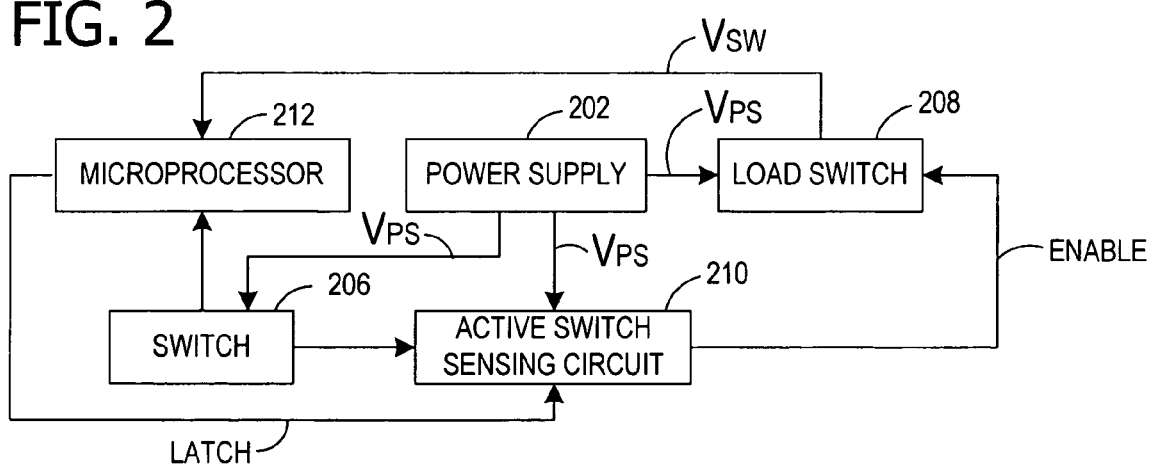
FIG. 2 is a block diagram illustrating a wakeup circuit using an active switch sensing circuit that eliminates the separate latch circuit according to one embodiment of the invention.

Referring now to FIG. 2, an embodiment of the invention using an active switch sensing circuit is shown. In this embodiment, a power supply 202 continuously supplies power VPS to a user input switch 206, an active switch sensing circuit 210, and a load switch 208, all of which, optionally, may be configured to have substantially no leakage currents while waiting for a user input.

In one embodiment, the active switch sensing circuit 210 is substantially a microprocessor from Microchip Corporation, PIC 10F202, which operates on less than 1 microamp of current while waiting for a switch 206 input. Some common ancillary circuitry may be required with this particular component to buffer the switch 206 input. The microprocessor used in the active switch sensing circuit 210 has limited capabilities which allow it to be designed to have low leakage currents. The active switch sensing circuit 210 is different from the passive switch sensing circuit 110 of FIG. 1, in that most of the sensing circuit's functions are located in one device instead of a number of discrete components. This allows for a smaller overall product and possibly reduces manufacturing costs.

When a user actuates the input switch 206, the active switch-sensing circuit 210 temporarily enables the load switch 208 to supply power VSW to the device's microprocessor 212. The microprocessor 212 starts up and instructs the active switch-sensing circuit 210 to continue causing the load switch 208 to supply power (e.g., provides a LATCH signal). The device then performs operations based on the user input of the switch 206. When the device has finished performing its operations, the microprocessor 212 waits for further user input for a preset period and then instructs the active switch-sensing circuit 210 to place the device into its sleep state. In response, the active switch-sensing circuit 210 signals the load switch 208 via the ENABLE signal to discontinue power VSW to the microprocessor 212. The device is thus returned to its sleep state wherein power VPS is only being supplied to the user input switch 206, active switch-sensing circuit 210, and the load switch 208. In this embodiment, the need for the separate latch circuit 104 has been eliminated by using an active switch-sensing circuit 210 which incorporates the function of the latch circuit 104.

It is contemplated that the timeout function (e.g. a period of time during which the microprocessor waits for further user input for a preset period and then instructs the wake-up circuit to place the device into its sleep state) may be implemented in the microprocessor of the device, in a separate circuit of the device, by the wake-up circuit itself or by a combination thereof.

A device can, and usually will, have multiple user input switches. It should be apparent to one skilled in the art that the invention will work with all, a select few, or even just one user input switch of the device. For example, additional switches are shown in phantom in FIG. 3.

The load switch also has multiple embodiments. In one preferred embodiment, it is a single p-channel FET. It may also be an array of p-channel FETs which may be required for devices that draw higher amounts of current when in use. In another embodiment, it may be an active load switch. One such active load switch is an FDC6323 manufactured by Fairchild Semiconductor. Active load switches may also be arrayed for additional current capacity.

It should be apparent to one skilled in the art that numerous combinations of sensing circuits, load switches, and user input switches can be made without deviating from the invention.

Figure 3:
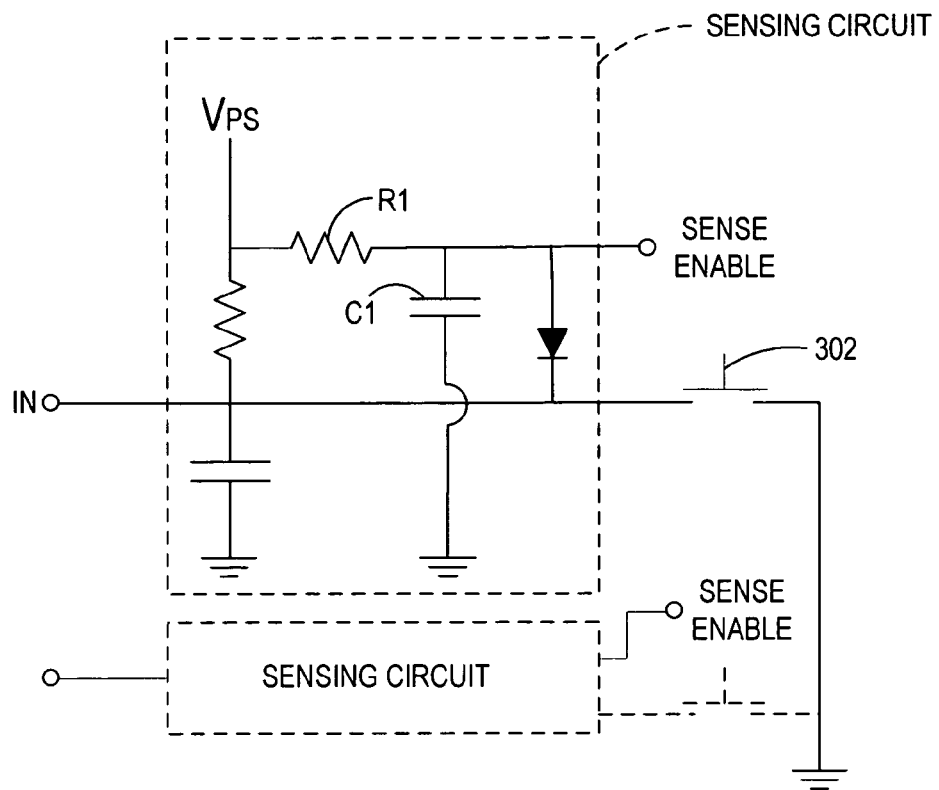
FIG. 3 is a schematic diagram illustrating a momentary switch and passive switch sensing circuit according to one embodiment of the invention.

Referring now to FIG. 3, one embodiment of a user input switch 106 is shown, along with a passive switch sensing circuit 110. The input VPS is a supply of continuous power from the power supply 102 (e.g., nominally 4.5 volts in the case of 3 AAA batteries in series). When a user activates a momentary switch 302, the SENSE ENABLE signal is pulled electrically low. When the switch 302 is released, the SENSE ENABLE signal remains temporarily low for a period of time determined by the values of resistor R1 and capacitor C1. The SENSE ENABLE signal activates the load switch 108 and thus causes power to be supplied to the device's microprocessor 112 while the signal is present. The resistor R1 and capacitor C1 of the passive switch sensing circuit 110 are selected so that the microprocessor 112 has adequate time to startup and provide the LATCH signal. Example values of resistor R1 and capacitor C1 for providing a sufficiently long SENSE ENABLE signal while keeping power usage low, are 1 megaohm and 0.1 microfarad, respectively. The microprocessor 112 then reads the input signal IN and performs operations according to that and any other inputs. As shown in phantom, additional sensing circuits may be used to monitor additional inputs.

Figure 4:
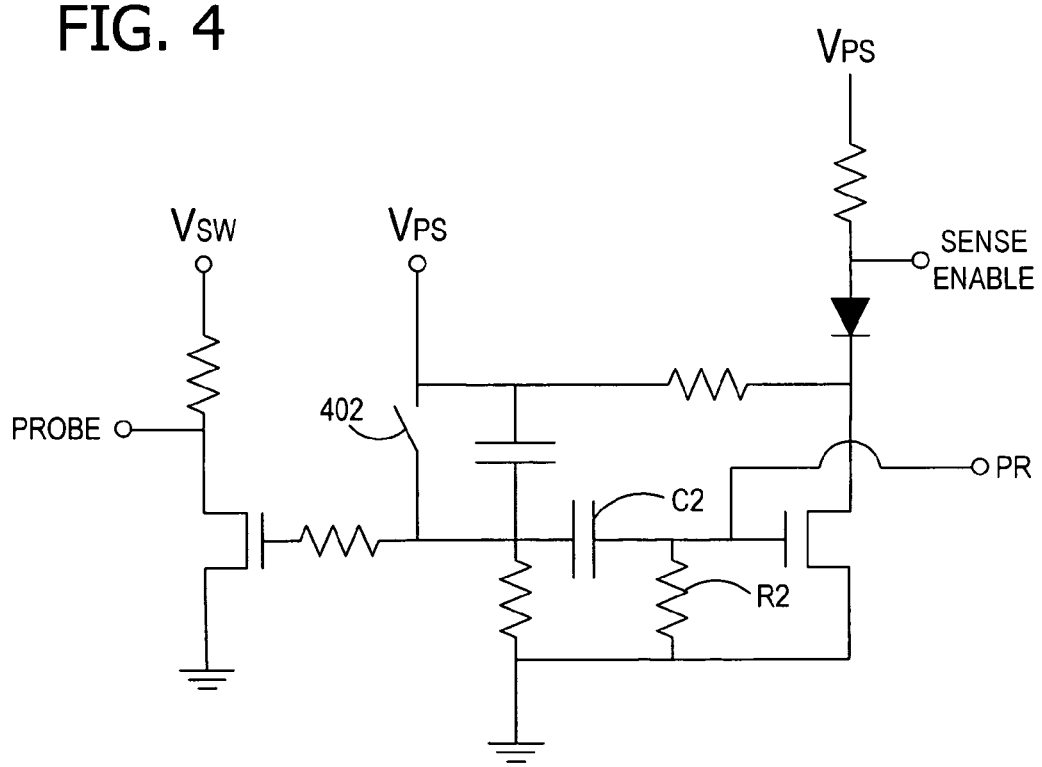
FIG. 4 is a schematic diagram illustrating a single pole switch and passive switch sensing circuit according to one embodiment of the invention.

Referring now to FIG. 4, an alternative embodiment of a user input switch 106 is shown, along with a passive switch-sensing circuit 110 (FIG. 1). Whereas the switch in FIG. 3 is a momentary switch, a switch 402 in this embodiment is a single throw, single pole switch. The input VSW is a supply of switched power directly from the load switch 108 or a regulator powered or enabled by the switched power from the load switch 108, and the input VPS is a supply of continuous power from the power supply 102 or an associated regulator. The switch 402 is suitable for connection as an indicator of a component or cover status of a device; e.g., whether the component is in a holder or not, whether there is a cover on a probe or not, and whether a cover is open or closed. An output pulse PR instructs the device's microprocessor 112 that the circuit was awakened by actuation of the associated component. An output signal PROBE tells the microprocessor 112 whether the switch 402 is open or closed, thus indicating the status of the component or cover. Changing the state of the switch 402 from open to closed wakes the device from its sleep state. The resistor R2 and capacitor C2 should be chosen so that the SENSE ENABLE signal is provided for a sufficient amount of time to start up the device's microprocessor 112. Example values of resistor R2 and capacitor C2 for providing a sufficiently long SENSE ENABLE signal while keeping power usage low, are 1 megaohm and 0.1 microfarad, respectively. The microprocessor 112 then supplies the LATCH signal to the latch circuit 104 which, in turn, causes the load switch 108 to continue supplying power to the microprocessor 112. The device is thus awakened from its sleep state and the microprocessor 112 can analyze to determine status, for example, if a cover has been placed on a probe through the use of the switch 402 and passive switch-sensing circuit 110.

Figure 5:
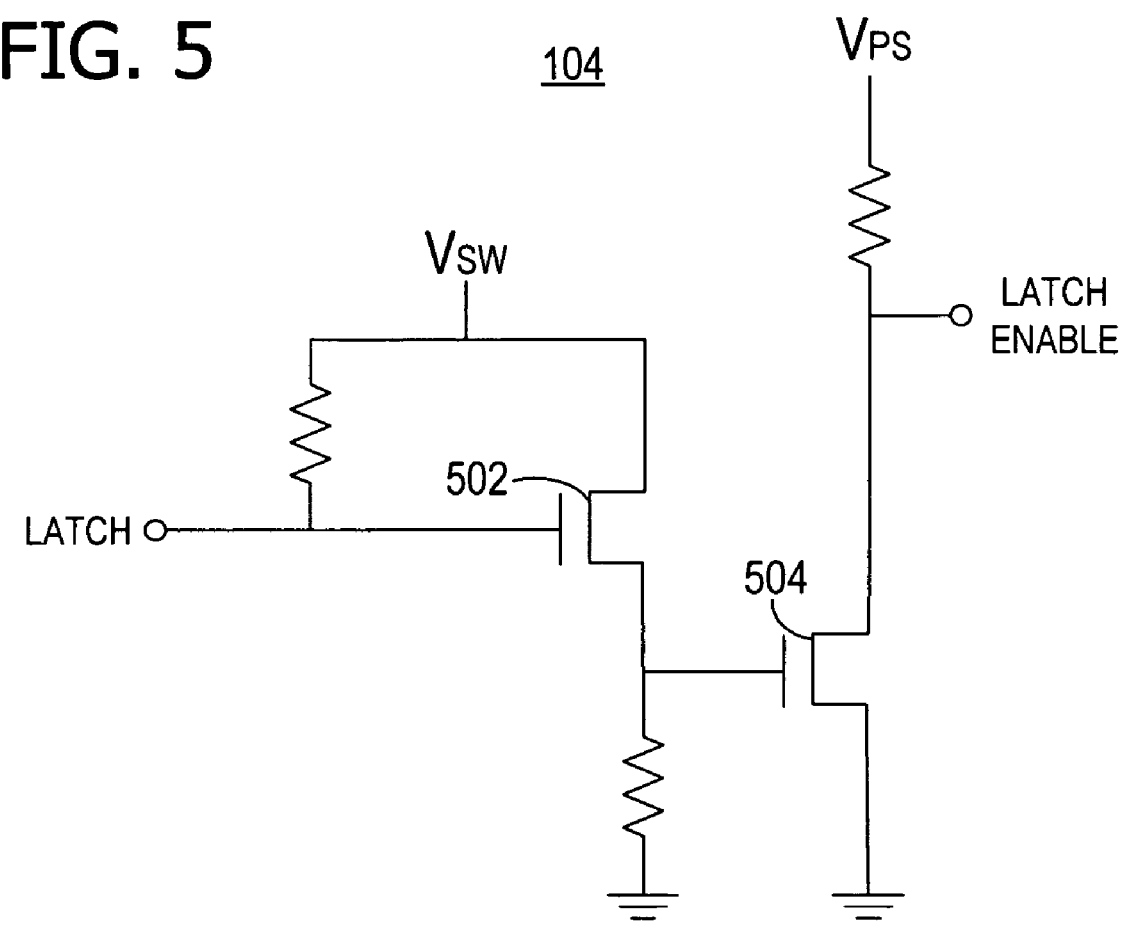
FIG. 5 is a schematic diagram illustrating a latch circuit according to one embodiment of the invention.

Referring now to FIG. 5, one embodiment of a latch circuit 104 is shown. While the latch circuit 104 is in its sleep state, both FET 502 and 504 are open circuits. The latch circuit 104 thus conducts substantially no current while the device is awaiting a user input, and the LATCH ENABLE signal is electrically high (e.g., the same voltage as VPS).

When the wake-up circuit has sensed a user input, the microprocessor 112 provides an input signal LATCH to the latch circuit 104. The LATCH signal causes the FET 502 to conduct current. This, in turn, raises the voltage at the gate of FET 504 causing it to conduct current and the LATCH ENABLE signal is pulled electrically low causing the load switch 108 to continue supplying power to the microprocessor 112. After the device has finished its operations, the microprocessor 112 waits for a timeout period then discontinues the LATCH signal. The latch circuit 104 discontinues the LATCH ENABLE signal which causes the load switch 108 to discontinue power to the microprocessor 112, placing the device in its sleep state.

It is contemplated that the embodiments in FIGS. 3-5 may be built into the circuitry of a device, or implemented as an add-on to existing device circuitry, such as in a daughterboard configuration.

Having described the invention in detail, it will be apparent that modifications and variations are possible without departing from the scope of the invention defined in the appended claims.

The order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein. For example, it is contemplated that executing or performing a particular element before, contemporaneously with, or after another element is within the scope of the various embodiments of the invention.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

What is claimed is:

1. An apparatus for selectively enabling power comprising:
   a power supply;
   a device having a controller and an input activated by a user, said controller selectively powered by the power supply;
   a sensing circuit for sensing activation of the input by the user and for enabling the power supply to provide power to the controller in response to the sensed activation of the input by the user;
   a latch circuit for causing the power supply to continue to provide power to the controller;
   a load switch responsive to a power supply enable signal for supplying power to the controller;
   wherein the sensing circuit initially provides the power supply enable signal to the load switch in response to the sensed activation of the input by the user;
   wherein the latch circuit provides the power supply enable signal to the load switch while the latch circuit is enabled by the controller and discontinues providing the power supply enable signal when disabled by the controller; and
   said controller responsive to the sensed activation of the input by the user for enabling the latch circuit and for disabling the latch circuit.

2. The apparatus of claim 1 wherein the load switch is an array of load switches.

3. The apparatus of claim 1 wherein the power supply continuously provides power to the input activated by the user, the sensing circuit, and the latch circuit independent of the load switch.

4. The apparatus of claim 1 wherein the input activated by the user is a switch associated with a probe for providing input to the controller.

5. The apparatus of claim 1 wherein the input activated by the user is a switch associated with a cover for the device.

6. The apparatus of claim 1 wherein the device is a clinical thermometer, pulse meter, blood pressure monitor, predictive thermometer, or blood sugar monitor.

* * * * *